(12) United States Patent
Chang et al.

(10) Patent No.: US 6,644,865 B2
(45) Date of Patent: Nov. 11, 2003

(54) FIBER OPTICAL TERMINAL WITH STRAIN RELIEF BOOT

(75) Inventors: Chih Chiang Chang, Tu-Chen (TW); Yao-Hao Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 95 days.

(21) Appl. No.: 10/033,645

(22) Filed: Dec. 27, 2001

(65) Prior Publication Data

US 2003/0091298 A1 May 15, 2003

(30) Foreign Application Priority Data

Nov. 15, 2001 (TW) .......................................... 90219623

(51) Int. Cl.[7] .................................................. G02B 6/36
(52) U.S. Cl. ...................................................... 385/86
(58) Field of Search .............................. 385/76, 77, 78, 385/86, 87, 88, 89, 92, 94

(56) References Cited

U.S. PATENT DOCUMENTS 5,315,679 A * 5/1994 Baldwin et al. .............. 385/76

* cited by examiner

Primary Examiner—Javaid H. Nasri
(74) Attorney, Agent, or Firm—Wei Te Chung

(57) ABSTRACT

A fiber optic terminal (10) of the present invention is for protecting a pair of optical fibers (71,72) entering an optical equipment housing (90). The fiber optic terminal includes an installment section (11), an orientation section (15), a first relief portion (12) and a second relief portion (13). The first relief portion and the second relief portion are integrally molded with the installment section and the orientation section. The fiber optic terminal further defines a first passageway (121) and a second passageway (131). In assembly, the two optical fibers are received in the fiber optic terminal through the passageways to connect with optical components in the housing, and the fiber optic terminal is tightly received in the housing.

2 Claims, 5 Drawing Sheets

FIBER OPTICAL TERMINAL WITH STRAIN RELIEF BOOT

BACKGROUND OF THE INVENTION

1. Field of the Invention

The present invention relates to a fiber optic terminal, and particularly to a fiber optic terminal with strain relief boot.

2. Description of the Related Art

Optical fibers are used in a variety of applications ranging from large scale telephonic communication systems to small optical networks, and generally include a transparent core made, for example, of glass, which is surrounded by cladding, which is also made of a transparent material, but having a different index of refraction than the core. The core and cladding combined have a diameter of as little as 125 microns, and are enclosed by a protective flexible jacket. Optical fibers are usually terminated and connected to optical components such as connectors, detectors, switches and attenuators.

As is the case with electrical cables, the point at which an optical fiber enters an optical component is subject to excessive stresses when loads are placed on the optical fiber. It is known to relieve the stresses by a strain relief system in the form of a flexible boot. An ideal strain relief for an optical fiber cable would permit maximum flexibility to a minimum bending radius of the fiber, while assuring a stable position at an optical component.

U.S. Pat. No. 5,315,679 discloses an optical fiber duplex connector assembly wherein two individual optical fiber connectors are positioned in and remain within a common housing. A boot is attached to the housing to accommodate severe bending and turning of the optical fiber, without loss of attenuation. However, the boot is loosely received in the housing. Any pull on the optical fibers will cause a movement between the boot and the housing. Over the long term, such movement may harm the optical fibers, causing additional insertion loss.

BRIEF DESCRIPTION OF THE INVENTION

An object of the present invention is to provide a fiber optic terminal having a strain relief boot.

A fiber optic terminal in accordance with the present invention comprises an installment section, an orientation section, a first relief portion and a second relief portion, wherein the first relief portion and the second relief portion are integrally molded with the installment section and the orientation section. The fiber optic terminal further defines a first passageway and a second passageway. The first passageway runs through the first relief portion and the orientation section, and the second passageway runs through the second relief portion and the orientation section. The fiber optic terminal can be tightly received in a housing. The housing comprises a base and a cover. The base defines a receiving cavity having substantially a same size as the installment section. The base further defines a U-shape opening having a shape substantially suited to engaging with the orientation section.

DETAILED DESCRIPTION OF THE INVENTION

Figure 1:
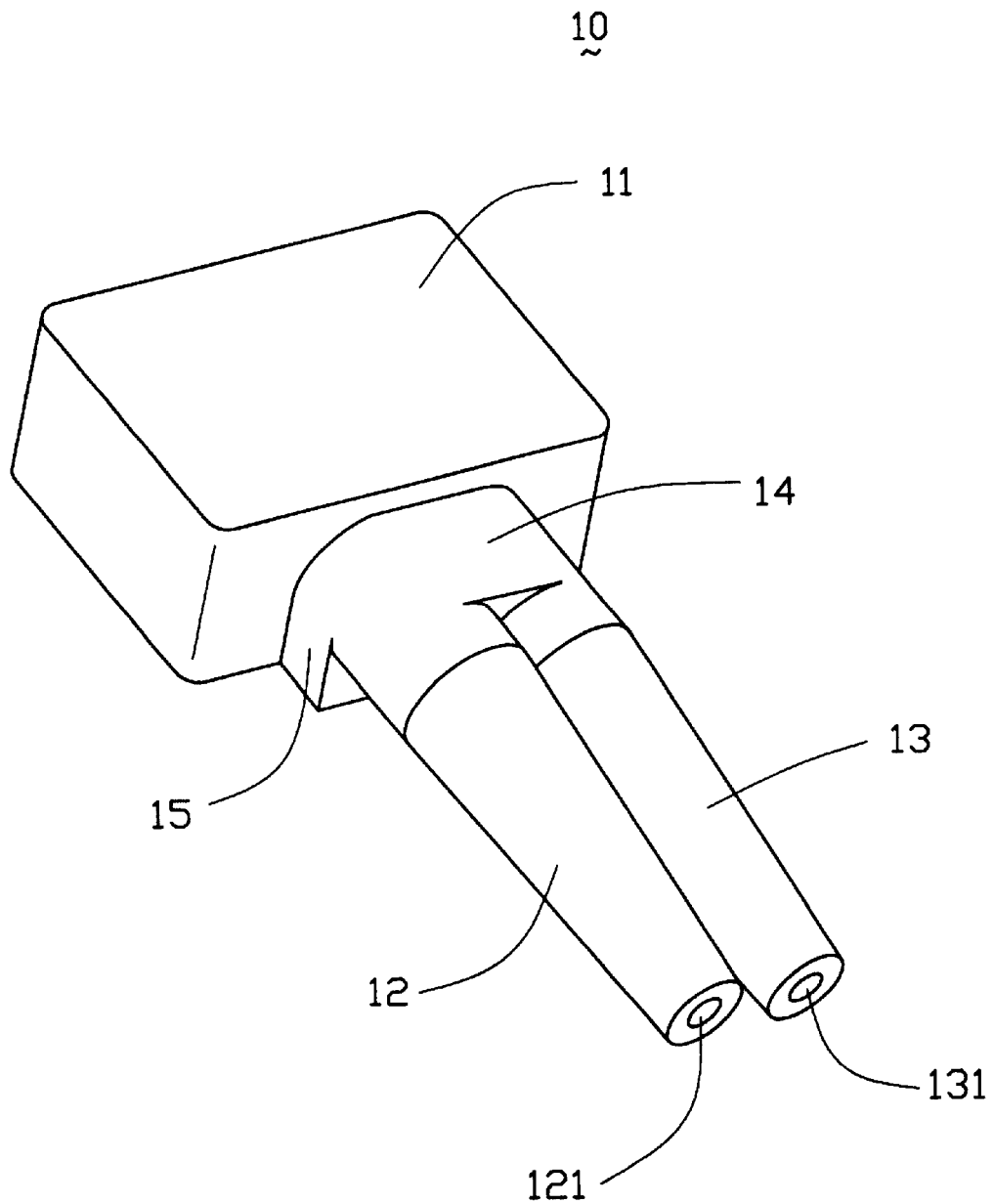
FIG. 1 is a perspective view of a fiber optic terminal according to the present invention from a bottom, side and rear aspect.
Figure 2:
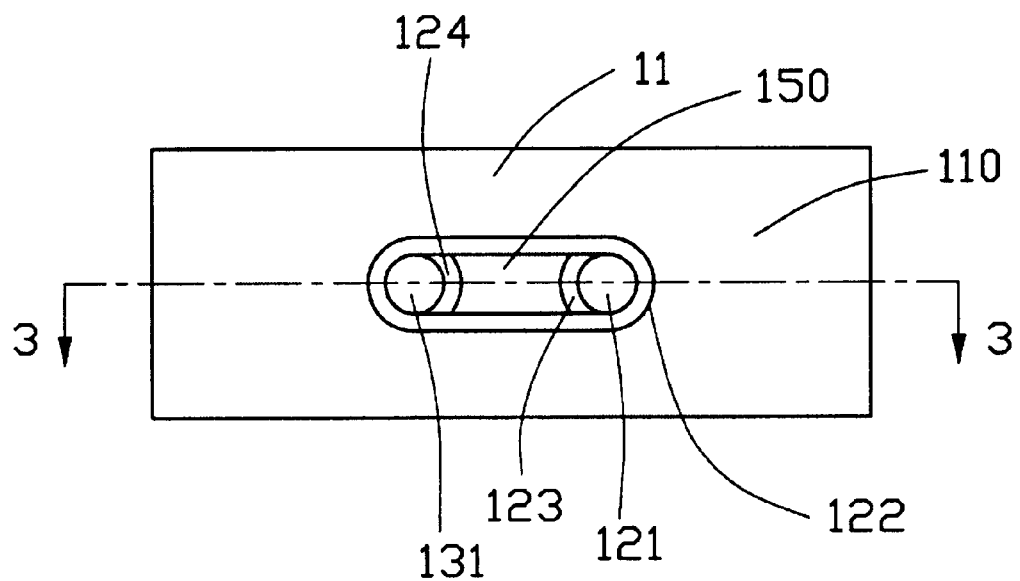
FIG. 2 is a front aspect elevational view of the fiber optic terminal of FIG. 1.
Figure 3:
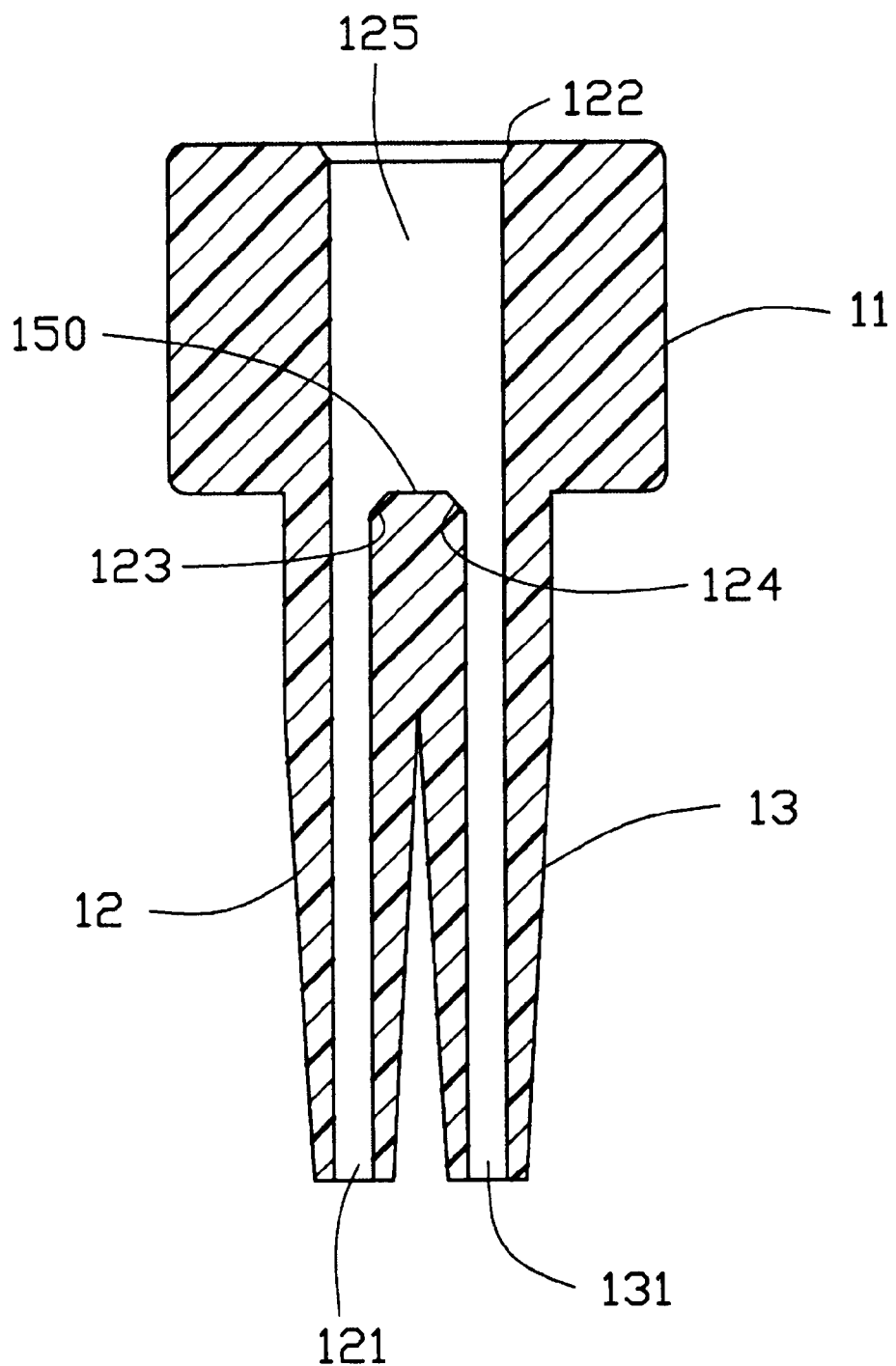
FIG. 3 is a cross-sectional view of the fiber optic terminal taken along line 3—3 in FIG. 2.

As shown in FIGS. 1, 2 and 3, a fiber optic terminal 10 of the present invention comprises an installment section 11, an orientation section 15, a first relief portion 12 and a second relief portion 13. The first relief portion 12, the second relief portion 13, the installment section 11 and the orientation section 15 are integrally molded of a flexible material. The orientation section 15 forms a U-shape surface 14 on an outside surface thereof. The fiber optic terminal 10 is for use with a pair of optical fibers 71, 72 and a piece of optical equipment having a housing, such as the optical switch housing 90 shown in FIG. 4.

A first passageway 121 is defined through the first relief portion 12 and the orientation section 15, and a second passageway 131 is defined through the second relief portion 13 and the orientation section 15. A cavity 125 is defined through the installment section 11 from a front face 110 of the fiber optic terminal 10 rearwardly to a front face 150 of the orientation section 15. The cavity 125 communicates with both the first and second passageways 121,131. A beveled lead surface 122 is defined at a front of the cavity 125 from the front face 110 of the fiber optic terminal 10. Two beveled lead surfaces 123, 124 are formed inside the orientation section 15 at the juncture of the first and second passages 121, 131 and the cavity 125, extending from the front face 150 of the orientation section 15. The lead surfaces 122, 123, 124 make insertion of the optical fibers 71, 72 through the fiber optic terminal 10 easier and provide better protection to the optical fibers than a right-angled surface would.

Note that optical fibers installed in the passageways 121, 131 can be loosely retained in the cavity 125, allowing more convenient connection of the optical fibers to optical components (not shown), such as collimators or ferrules, installed in the housing 90.

Figure 4:
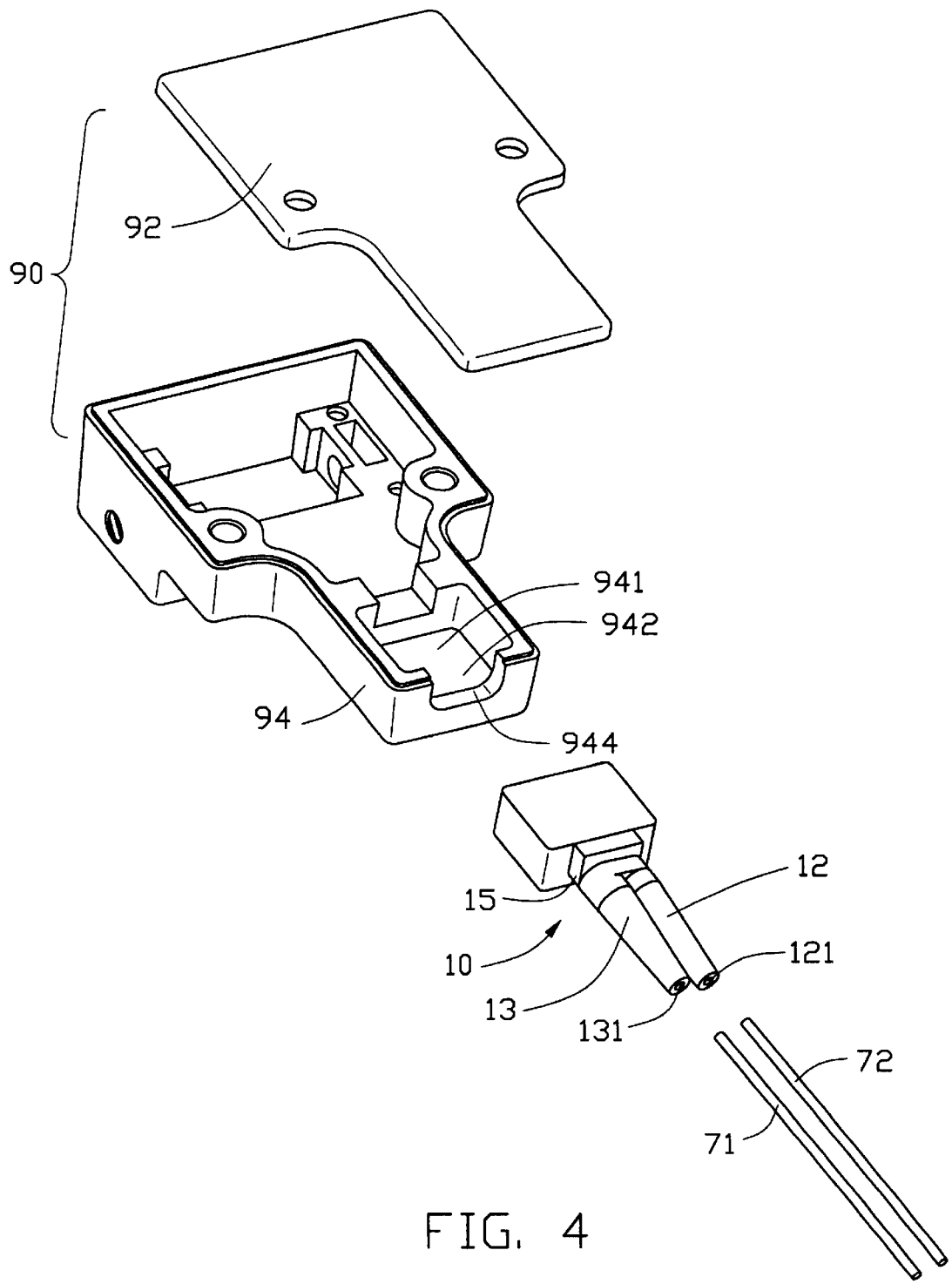
FIG. 4 is an exploded perspective view of the fiber optic terminal of FIG. 1 and a fiber optic equipment housing and pair of optical fibers.
Figure 5:
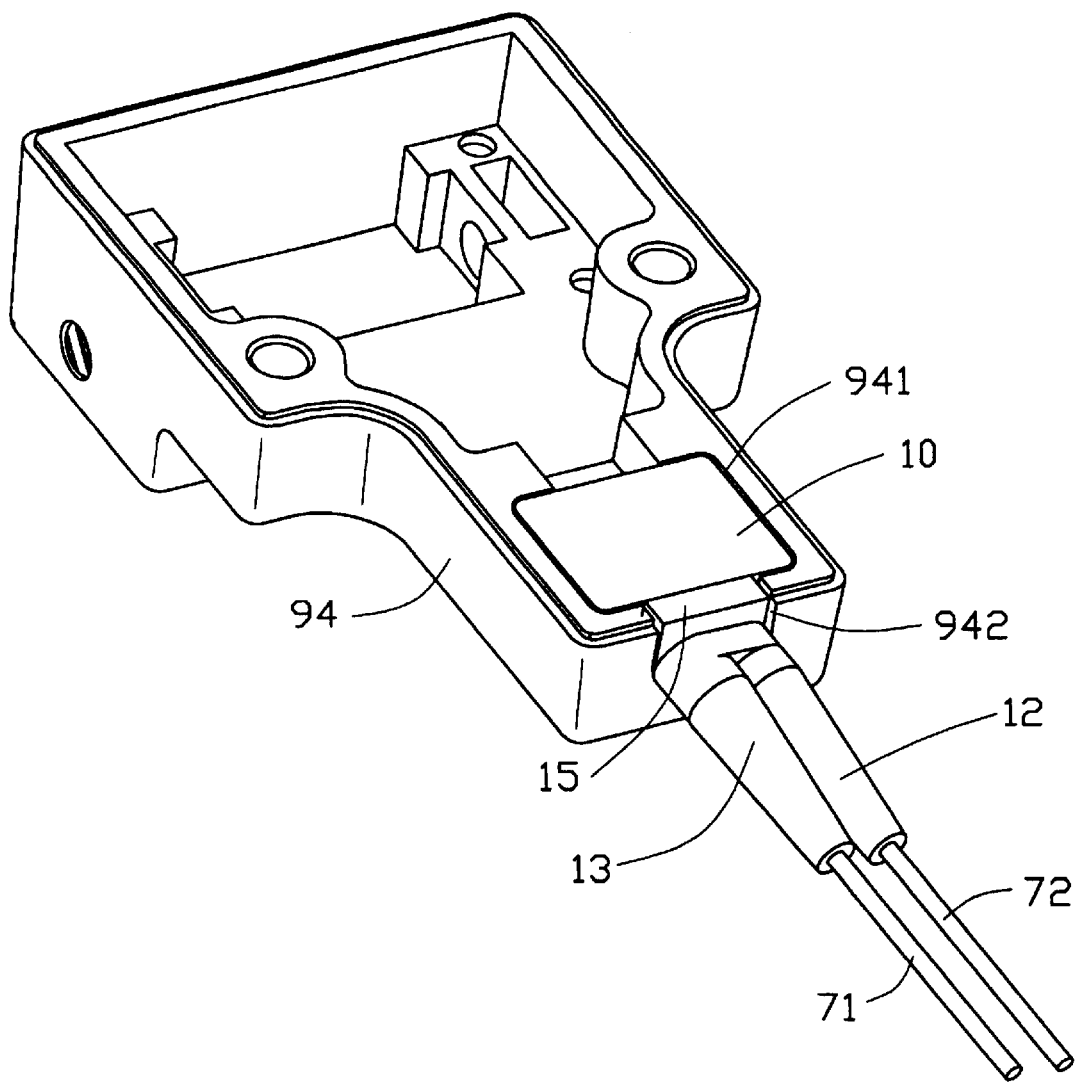
FIG. 5 is an assembled view of the fiber optic terminal and equipment housing of FIG. 4, with a housing cover removed.

Referring to FIGS. 4 and 5, the fiber optic terminal 10 is assembled with the optical switch housing 90. The housing 90 comprises a base 94 and a cover 92. The base 94 defines a receiving cavity 941 having substantially the same size as the installment section 11. The base 94 further forms a U-shape surface 944 defining a U-shape opening 942, which corresponds in shape to the U-shape surface 14 of the orientation section 15.

In assembly, the two optical fibers 71, 72 are received in the fiber optic terminal 10 through the passageways 121, 131 to connect with optical components (not shown) in the optical switch housing 90. A thickness of the installment section 11 is equal to a depth of the receiving cavity 941, so that when the cover 92 is assembled to the base 94, the installment section 11 can be tightly contained within the receiving cavity 941. At the same time, U-shaped surface 944 defining the opening 942 engages with the U-shape surface 14 of the orientation section 15.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fiber optic terminal for holding and protecting a first and second optical fibers entering into a housing of an optical equipment, comprising:
   a fixed section forming a first portion and a second portion, the first portion having a cavity defined therethrough, the second portion having outside dimensions for tightly fitting within an opening defined through a side of the housing;
   a first relief portion connected to the second portion of the fixed section; and
   a second relief portion connected to the second portion of the fixed section;
   wherein said first relief portion and said second relief portion are integrally molded with the fixed section, and a first passageway is defined through the first relief portion and the second portion of the fixed section and a second passageway is defined through the second relief portion and the second portion of the fixed section, and the first and second passageways are both in communication with the cavity of the first portion of the fixed section, and the first and second passageways, with the cavity, are adapted to accommodate the first and second optical fibers, respectively; wherein
   the fixed section comprises a beveled lead surface at an entrance to the cavity; wherein
   the first portion has substantially a same size as a receiving cavity in the housing; wherein
   the second portion includes a U-shape surface; wherein
   the housing further comprises a U-shape opening for mating with the U-shape surface of the second portion.

2. A fiber optic terminal assembly comprising:
   a housing including a receiving cavity and an opening;
   a fiber optic terminal comprising:
      a fixed section tightly contained in the housing having a first portion and a second portion, the first portion defining a cavity and the second portion having a surface suited for mating with the opening of the housing;
      a first relief portion for receiving a first optical fiber; and
      a second relief portion for receiving a second optical fiber;
      wherein said first relief portion and said second relief portion are integrally molded with said fixed section, and said relief portions and the fixed section together define a first passageway and a second passageway, which communicate with the cavity, for accommodating the first and second optical fibers; wherein
   the fixed section comprises a beveled lead surface at an entrance to the cavity; wherein
   the receiving cavity of the housing has substantially a same size as the first portion of the fixed section; wherein
   the second portion includes a U-shape surface; wherein
   the housing further comprises a U-shape opening for mating with the U-shape surface of the second portion.

* * * * *